(12) United States Patent
Sandstrom

(10) Patent No.: US 7,015,272 B2
(45) Date of Patent: Mar. 21, 2006

(54) RUBBER WITH POLYETHYLENE AND PHENYLENE BISMALEIMIDE AND TIRE WITH COMPONENT THEREOF

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 434 days.

(21) Appl. No.: 10/283,449

(22) Filed: Oct. 28, 2002

(65) Prior Publication Data

US 2004/0082702 A1    Apr. 29, 2004

(51) Int. Cl.
| | |
|---|---|
| C08K 3/04 | (2006.01) |
| C08K 3/36 | (2006.01) |
| C08K 5/3415 | (2006.01) |
| C08L 7/00 | (2006.01) |
| C08L 9/00 | (2006.01) |

(52) U.S. Cl. .................. 524/495; 524/496; 524/493
(58) Field of Classification Search ................ 524/492, 524/493, 495, 496
See application file for complete search history.

(56) References Cited

U.S. PATENT DOCUMENTS

| | | | | |
|---|---|---|---|---|
| 4,005,054 | A | 1/1977 | Bonnefon et al. | 260/42.56 |
| 4,675,349 | A * | 6/1987 | Palombo et al. | 523/351 |
| 5,985,963 | A * | 11/1999 | D'Sidocky et al. | 524/105 |
| 6,036,800 | A | 3/2000 | Corvasce et al. | 156/123 |
| 6,202,726 | B1 | 3/2001 | Corvasce et al. | 152/517 |

FOREIGN PATENT DOCUMENTS

| | | |
|---|---|---|
| EP | 867471 | 9/1998 |
| EP | 906838 | 4/1999 |

* cited by examiner

Primary Examiner—Katarzyna Wyrozebski-Lee
(74) Attorney, Agent, or Firm—Henry C. Young, Jr.

(57) ABSTRACT

A pneumatic rubber tire having a rubber composition prepared with ultra high molecular weight crystalline polyethylene and m-phenylene bismaleimide. Such crystalline polyethylene has a melting point in a range of about 125° C. to about 140° C. Such rubber composition is prepared by blending its elastomers and ultra high molecular weight polyethylene together with m-phenylene bismaleimide at a temperature in a range of from about 150° C. to about 180° C. and at least 10° C. above the melting point of said polyethylene, prior to subsequently blending sulfur curatives therewith at a temperature in a range of from about 90° C. to about 115° C. Such rubber composition may be a tire component such as, for example, circumferential rubber tread, rubber tire sidewall, circumferential cord reinforced rubber belt underlying a tire tread and carcass cord reinforced rubber ply components.

8 Claims, No Drawings

US 7,015,272 B2

RUBBER WITH POLYETHYLENE AND PHENYLENE BISMALEIMIDE AND TIRE WITH COMPONENT THEREOF

FIELD OF THE INVENTION

A pneumatic rubber tire having a rubber composition prepared with ultra high molecular weight crystalline polyethylene and m-phenylene bismaleimide. Such crystalline polyethylene has a melting point in a range of about 125° C. to about 140° C. Such rubber composition is prepared by blending its elastomers and ultra high molecular weight polyethylene together with m-phenylene bismaleimide at a temperature in a range of from about 150° C. to about 180° C. and at least 10° C. above the melting point of said polyethylene, prior to subsequently blending sulfur curatives therewith at a temperature in a range of from about 90° C. to about 115° C. Such rubber composition may be a tire component such as, for example, circumferential rubber tread, rubber tire sidewall, circumferential cord reinforced rubber belt underlying a tire tread and carcass cord reinforced rubber ply components.

BACKGROUND OF THE INVENTION

Pneumatic rubber tires typically contain a circumferential tread of a rubber composition having a suitable balance between abrasion resistance, rebound and tan delta (0° C.) values to promote tire treads having resistance to treadwear, good rolling resistance and having suitable wet traction.

For some applications, it has been proposed to provide such rubber compositions with an inclusion, or dispersion, of a finely divided, high density, high molecular weight polyethylene.

For example, U.S. Pat. No. 4,675,349 relates to a tire tread cap which contains high molecular weight particles having a weight molecular weight average of from one to six million, a softening point above 275° C. (133° C.) together with processing oil, wherein it is required that the polyethylene is mixed with the rubber composition at a relatively low mixing temperature of from about 200° F. to 240° F. (about 93.3° C. to 115.5° C.) which is well below the softening point of the polyethylene. The polyethylene is reported as being a crystalline and linear polymer.

For example, U.S. Pat. No. 4,005,054 relates to a rubber composition containing a crystalline polyolefin, which can be a polyethylene, having a molecular weight equal or greater than 500,000 in which a substantial portion is in a condition of fine particles which are drawn out in a form of elongated fibrils in a manner that it is said that the rubber composition has a very high resistance to elongation in at least one direction. The rubber composition is prepared by kneading at a temperature close to and preferably higher than the melting of the polyolefin so as to obtain a fibrillation in situ of the polyolefin particles.

Other patent publications relating to rubber compositions which contain an inclusion of a dispersion of a very high molecular weight polyethylene polymer, particularly for one or more tire components, include, for example U.S. Pat. Nos. 6,036,800, 3,842,883, 3,759,306 and 6,202,726 and European patent publication EP 906,838.

In practice, this invention relies upon an inclusion of m-phenylene bismaleimide by hot blending with an ultra high molecular weight crystalline polyethylene (UHMWPE) which is considered herein to enhance one or more physical properties of a rubber composition which contains the UHMWPE. For such inclusion, it is required that the m-phenylene bismaleimide is blended, together with the elastomers of the rubber composition, with the UHMWPE at a temperature above the melting point of the UHMWPE.

It is recognized that the ultra high molecular weight crystalline polyethylene particles are both particularly incompatible with the diene-based elastomer(s) contained in the tread rubber composition and, moreover, do not contain olefinic unsaturation to co-vulcanize with the elastomers in the rubber composition. While the mechanism may not be entirely understood, it is believed herein that the hot mixing (above the melting point of the polyethylene polymer) of the m-phenylene bismaleimide with both the elastomer(s) and ultra high molecular weight polyethylene polymer may act to promote crosslinks between the UHMWPE and the diene-based elastomers.

In the description of this invention, the term "phr" where used relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated.

DISCLOSURE AND PRACTICE OF THE INVENTION

In accordance with this invention, a process of preparing a rubber composition comprised of at least one diene-based elastomer and ultra high molecular weight polyethylene comprises, based upon parts by weight per 100 parts by weight rubber (phr):

(A) blending, at a temperature in a range of from about 150° C. to about 180° C.:
  (1) 100 phr of at least one conjugated diene-based elastomer;
  (2) about 20 to about 120, alternately about 30 to about 80, phr of reinforcing filler, wherein said reinforcing filler is preferably selected from carbon black, precipitated silica and carbon black and precipitated silica with a carbon black to silica of a weight ratio in a range of from about 1/5 to about 5/1;
  (4) coupling agent for said precipitated silica (where said silica is used) having a moiety reactive with hydroxyl groups (e.g. silanol groups) on the surface of said silica and another moiety interactive with said diene-based elastomer(s);
  (5) about 0.1 to about 3, alternately about 0.25 to about 2, phr of m-phenylene bismaleimide;
  (6) about 2 to about 40, alternately about 5 to about 20 phr of ultra high molecular weight crystalline and linear polyethylene (UHMWPE) having a melting point (ISO 1628, Part 3) in a range of from about 125° C. to about 140° C., an average molecular weight in a range of from about 2 to about 20, alternately about 5 to about 15 million g/mol (according to ISO 3146 Method C), wherein said mixing temperature is at least 10° C. higher than said melting point of said UHMWPE, and in a subsequent procedure:

(B) Cooling said pre-formed composite to a temperature below 40° C. and mixing therewith, at a temperature in a range of about 90° C. to about 115° C., vulcanizing ingredients comprised of sulfur and at least one sulfur vulcanization accelerator.

In one aspect where the reinforcement is silica, and particularly a combination of silica and carbon black, together with the coupling agent, the said blending procedure to a temperature in said range of from 150° C. to 180° C. may be conducted by mixing the ingredients to a temperature within said temperature range over a period of from 2 to 4 minutes, following which the mixing temperature is maintained within 10° C., preferably within 5° C., of such temperature for an extended period of mixing, such as from 2 to about 4 minutes, to enable said coupling agent to more effectively couple said silica and elastomer(s). For example, the ingredients may be mixed to a temperature of 165° C. +/−10° C. over a period of from 2 to 4 minutes and the mixing continued for an additional period of mixing of from 2 to 4 minutes at a temperature within 5° C. of said mix temperature.

In practice, it is to be understood that additional conventional rubber compounding ingredients may be mixed with said elastomer, polyethylene and m-phenylene bismaleimide. In practice it is understood that the additional compounding ingredients may be mixed in said hot mixing step of subsequent mixing step prior to said mixing step for addition of vulcanizing ingredients.

In further accordance with this invention, a pneumatic rubber tire is provided having at least one component comprised of said rubber composition. In practice, said component may be, for example, a circumferential tire tread, tire sidewall or tire carcass cord reinforced ply.

A significant aspect of this invention is considered herein to be the preparation of a rubber composition for a component of a tire which involves blending a pre-formed composite by hot mixing said UHMWPE and m-phenylene bismaleimide with a diene-based rubber composition which contains a combination of carbon black, silica and coupling agent.

This is considered herein to be significant because it has been observed that utilization of the pre-formed composite with a diene-based elastomer which contained carbon black alone and without a silane coupler presented marginal improvement in cured properties of the resulting rubber composition.

The morphology of the UHMWPE is an aspect of this invention, namely a combination of its ultra high molecular weight and its preferable shape as being round, or substantially spherical configuration. While the benefit of such morphology is not completely understood, it is believed that because the crystalline polyethylene is of such an ultra high molecular weight its spherically shaped particles retain a substantially spherical shape even after relatively high shear mixing with the rubber composition at a temperature somewhat above the melting point of the polyethylene itself. Apparently the resultant substantially spherical polyethylene particles are beneficial for the associated rubber compositions. Apparently, it might be postulated that the m-phenylene bismaleimide interacts better, or more efficiently or effectively, with a greater, compact, surface presented by a substantially spherically shaped particle.

For the purposes of this description, the "compounded" rubber compositions refer to the respective rubber compositions which have been compounded with appropriate compounding ingredients such as, for example, carbon black, silica, oil, stearic acid, zinc oxide, wax, antidegradants, resin(s), sulfur and accelerator(s) as well as the aforesaid ultra high molecular weight polyethylene and m-phenylene bismaleimide.

Various coupling agents may be used for the precipitated silica as would be well known to one having skill in such art, particularly alkoxysilane polysulfide coupling agents. Representative of such coupling agents are, for example, bis (3-trialkoxysilylalkyl) polysulfides having an average of from 2 to 2.6 or an average of from 3.5 to 4, connecting sulfur atoms in its polysulfidic bridge. Such coupling agent may therefore be a bis(3-triethoxysilylpropyl) polysulfide.

In the practice of this invention, the rubber composition of said tire tread may be comprised of a diene-based elastomer selected from, for example, polymers and copolymers of at least one of isoprene and 1,3-butadiene and copolymers of styrene and/or alpha methylstyrene, preferably styrene, with at least one of isoprene and 1,3-butadiene.

The selection of elastomers for the tire tread may depend, for example, somewhat upon a specific tire design, intended use of the tire, and whether it is desired for the tread to be optimized for reduced rolling resistance, increased traction and/or resistance to treadwear.

Representative of such elastomers are, for example, are one or more elastomers selected from cis 1,4-polyisoprene rubber (natural or synthetic), cis 1,4-polybutadiene rubber, styrene/butadiene copolymer rubbers (whether prepared by solvent solution or aqueous emulsion polymerization), styrene/isoprene/butadiene terpolymer rubbers, isoprene/butadiene copolymer rubber, high vinyl polybutadiene rubber having a vinyl 1,2-content in a range of from about 30 to about 90 percent, trans 1,4-polybutadiene rubber and 3,4-polyisoprene rubber. Preferably it is comprised primarily of a combination of elastomers selected from cis 1,4-polyisoprene rubber, cis 1,4-polybutadiene rubber and styrene/butadiene copolymer rubber.

In practice, the rubber composition may contain a tin and/or silicon coupled, preferably tin coupled, diene-based elastomer prepared by organic solvent polymerization in the presence of a suitable tin-based catalyst complex, or tin based coupling agent, of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In practice, the rubber composition may contain a functionalized diene-based elastomer. For example, a functionalized elastomer may be provided as a diene-based elastomer as described above which contains one or more functional groups such as, for example, one or more hydroxyl groups, carboxyl groups, silanol groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, clay (particularly water swellable clay such as for example montmorillonite clay), and starch-based reinforcement. Such functionalized diene-based elastomers, and their preparation, are well known to those having skill in such art.

It is readily understood by those having skill in the art that the rubber compositions of the external tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fatty acid, zinc oxide, waxes, antioxidants and antiozonants, peptizing agents and reinforcing material as the aforementioned carbon black. As known to those skilled in the art, depending on the intended use of the sulfur vulcanizable and sulfur vulcanized material (rubbers), the additives mentioned above are selected and commonly used in conventional amounts.

Typical additions of reinforcing fillers may comprise about 20 to 120 parts by weight per 100 parts by weight of diene rubber (phr), preferably 30 to 80 phr. Typical amounts of tackifier resins, if used, may comprise about 0.5 to about 10 phr, usually about 1 to about 5 phr. Typical amounts of processing aids may comprise 1 to 50 phr. Such processing aids may include aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of ultra high molecular weight polyethylene with m-phenylene bismaleimide in elastomer compositions for tire components.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amounts, 0.5 to 2 phr, and a secondary accelerator which is generally used in amounts of 0.05 to 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization a combination of m-phenylene bismaleimide and ultra high molecular weight polyethylene prepared by high temperature mixing.

Sometimes a combination of antioxidants and antiozonants may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

For these examples, samples of rubber compositions are prepared with various ultra high molecular weight polyethylene polymers (UHMWPE's) as products of the Ticona Company (e.g. GUR2122™) which are referenced in the following Table A, namely UHMWPE's 1 through 4.

TABLE A

| UHMWPE | Commercial Product | Morphology[1] | Microns Particle Size | °C. Melting Point |
|---|---|---|---|---|
| UHMWPE-1 | GUR 2122 ™ | irregular | 140 | 130–135 |
| UHMWPE-2 | GUR 2126 ™ | irregular | 30 | 130–135 |
| UHMWPE-3 | GUR 4120 ™ | round (spherical) | 120 | 130–135 |
| UHMWPE-4 | GUR 4186 ™ | round (spherical) | 60 | 130–135 |

[1]Preferably, the morphology of the UHMWPE is of a round, substantially spherical, configuration shape in combination with the aforesaid ultra high molecular weight.

EXAMPLE I

Comparative rubber samples are prepared by blending an ultra high molecular weight polyethylene (UHMWPE) with synthetic cis 1,4-polyisoprene rubber and carbon black reinforcement in a first non-productive mixing step in an internal rubber mixer to about 150° C., which amounted to about 4 minutes of mixing. In a second, subsequent, non-productive mixing step, the rubber mixture is mixed in an internal rubber mixer to a temperature of about 160° C., followed by an extended mixing of the rubber mixture, while maintaining mixing temperature at about 160° C. by controlling the mixing speed, for an additional 4 minutes after the mixture reaches the 160° C. which amounts to about 6 to 7 minutes of mixing for the second non-productive mixing step.

The resulting mixture is then mixed with curatives to a temperature of about 108° C. in a productive mixing step in an internal rubber mixer. The rubber composition is cooled to below 40° C. between each of the non-productive mixing steps and between the second non-productive mixing step and the productive mixing step.

The basic recipe for the comparative rubber samples is presented in the following Table 1.

TABLE 1

| | Parts |
|---|---|
| First Non-Productive Mixing Step (Mixed to 150° C.) | |
| Cis 1,4-polyisoprene rubber[1] | 100 |
| Carbon black[2] | 50 or 40 |
| UHMWPE[3] | 0 or 10 |
| Processing oil[4] | 5 |
| Fatty acid[5] | 2 |
| Antioxidant[6] | 2 |
| Zinc oxide | 3 |
| Second Non-Productive Mixing Step | |
| Mixed to 160° C. and continued mixing at 160° C. for 4 minutes | |
| Productive Mixing Step (Mixed to 108° C.) | |
| Sulfur | 1.3 |
| Accelerator[7] | 1 |

[1]NAT2200, a synthetic cis 1,4-polyisoprene from The Goodyear Tire & Rubber Company
[2]ASTM N299
[3]Designated in Table 1
[4]Flexon 641 from Exxon Mobil
[5]Primarily stearic acid
[6]Quinoline type
[7]Sulfenamide type The following Table 2 illustrates cure behavior and various physical properties of rubber compositions based upon the basic recipe of Table 1 and reported herein as Samples A through E, with Sample A being a Control Sample without an addition of a UHMWPE.

TABLE 2

|  | Samples | | | | |
|---|---|---|---|---|---|
|  | Control A | B | C | D | E |
| Carbon black | 50 | 40 | 40 | 40 | 40 |
| UHMWPE-1 (irregular shape) | 0 | 10 | 0 | 0 | 0 |
| UHMWPE-2 (irregular shape) | 0 | 0 | 10 | 0 | 0 |
| UHMWPE-3 (spherical shape) | 0 | 0 | 0 | 10 | 0 |
| UHMWPE-4 (spherical shape) | 0 | 0 | 0 | 0 | 10 |
| Rheometer, 150° C. (MDR)[1] | | | | | |
| Maximum torque (dNm) | 16.25 | 14.02 | 13.77 | 13.95 | 14.25 |
| Minimum torque (dNm) | 2.46 | 1.99 | 2.03 | 2.11 | 2.13 |
| Delta torque (dNm) | 13.79 | 12.03 | 11.74 | 11.84 | 12.12 |
| $T_{25}$, minutes | 4 | 5.1 | 5.2 | 5 | 4.9 |
| $T_{90}$, minutes | 7.1 | 8.1 | 8.1 | 7.9 | 7.8 |
| Stress-strain (ATS)[2] | | | | | |
| Tensile strength (MPa) | 21.5 | 20.4 | 20.8 | 18.8 | 20.9 |
| Elongation at break (%) | 515 | 500 | 510 | 490 | 510 |
| 300% modulus (MPa) | 9.8 | 10.5 | 10.1 | 9.6 | 9.8 |
| Rebound | | | | | |
| 23° C. | 46 | 51 | 50 | 51 | 52 |
| 100° C. | 60 | 62 | 63 | 65 | 66 |
| Hardness (Shore A) | | | | | |
| 23° C. | 61 | 66 | 64 | 60 | 60 |
| 100° C. | 55 | 59 | 57 | 55 | 55 |
| Tear strength, N (95° C.)[3] | 187 | 139 | 149 | 128 | 134 |
| DIN Abrasion (2.5 N, cc loss)[4] | 110 | 128 | 124 | 128 | 130 |
| RPA, 100° C., 1 Hz[5] | | | | | |
| Storage modulus G', at 10% strain (kPa) | 1029 | 995 | 966 | 981 | 996 |
| Tan delta at 10% strain | 0.154 | 0.122 | 0.12 | 0.121 | 0.119 |

[1]Data obtained according to Moving Die Rheometer instrument, model MDR-2000 by Alpha Technologies, used for determining cure characteristics of elastomeric materials, such as for example Torque, T25, etc.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Data obtained according to a peel strength adhesion test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. The area of contact at the interface between the rubber samples is facilitated by placement of a Mylar ™ film between the samples with a cut-out window in the film to enable the two rubber samples to contact each other following which the samples are vulcanized together and the resultant composite of the two rubber compositions used for the peel strength test.
[4]Data obtained according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.
[5]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.

From Table 2 it is seen that improved hysteresis, as evidenced by higher hot and cold rebound values and lower Tan delta (100° C.) values, are obtained by the partial replacement of carbon black by the UHMWPE for Samples B through E as compared to Control Sample A.

It is also seen, however, that the tear strength (peel adhesion test) and DIN abrasion values are adversely affected by the partial replacement of carbon black by the UHMWPE for Samples B through E as compared to Control Sample A.

EXAMPLE II

Rubber samples are prepared by blending an ultra high molecular weight polyethylene (UHMWPE) with synthetic cis 1,4-polyisoprene rubber and carbon black reinforcement in the manner of Example I.

The basic recipe for the rubber samples is presented in the following Table 3 which is similar to that of Table 1 of Example I except that m-phenylene bismaleimide is included as an ingredient.

TABLE 3

|  | Parts |
|---|---|
| First Non-Productive Mix | |
| Cis 1,4-polyisoprene rubber | 100 |
| Carbon black | 50 or 40 |
| UHMWPE-1 | 0 or 10 |
| Processing oil | 5 |
| Fatty acid | 2 |
| Antioxidant | 2 |
| Zinc oxide | 3 |
| M-phenylene bis maleimide | 0 or 1 |
| Second Non-Productive Mix | |
| Mixed to 160° C. and continued mixing for 4 minutes | |
| Productive Mix | |
| Sulfur | 1.3 |
| Accelerator | 1 |

The following Table 4 illustrates cure behavior and various physical properties for rubber samples based upon the basic recipe of Table 3, and reported herein as Samples F through H, with Sample F being a Control Sample, where the m-phenylene bismaleimide is introduced in Sample H.

TABLE 4

|  | Samples | | |
|---|---|---|---|
|  | Control F | G | H |
| Carbon black | 50 | 40 | 40 |
| UHMWPE-1 | 0 | 10 | 10 |
| m-phenylene bismaleimide | 0 | 0 | 1 |
| Rheometer, 150° C. | | | |
| Maximum torque (dNm) | 17.12 | 14.18 | 18.36 |
| Minimum torque (dNm) | 2.63 | 2.28 | 2.46 |
| Delta torque (dNm) | 14.49 | 11.9 | 15.9 |
| $T_{25}$, minutes | 4.5 | 5.7 | 6.2 |
| $T_{90}$, minutes | 7.8 | 9 | 9.9 |
| Stress-strain | | | |
| Tensile strength (MPa) | 21.6 | 20.8 | 23 |
| Elongation at break (%) | 500 | 500 | 490 |
| 300% modulus (MPa) | 10.7 | 10.3 | 12.3 |
| Rebound | | | |
| 23° C. | 44 | 50 | 52 |
| 100° C. | 60 | 63 | 65 |
| Hardness (Shore A) | | | |
| 23° C. | 62 | 65 | 68 |
| 100° C. | 57 | 59 | 64 |

TABLE 4-continued

|  | Samples | | |
| --- | --- | --- | --- |
|  | Control F | G | H |
| Tear strength, N (95° C.) | 176 | 172 | 150 |
| DIN abrasion (cc loss) | 107 | 121 | 118 |
| RPA, 100° C., 1 Hz |  |  |  |
| Storage modulus G', at 10% strain (kPa) | 1107 | 1017 | 1454 |
| Tan delta at 10% strain | 0.172 | 0.134 | 0.135 |

From Table 4, it can be seen that addition of the m-phenylene bismaleimide, together with partial replacement of carbon black with the UHMWPE in the hot, non-productive mixing stage, provided an improved hysteresis as evidenced in Sample H with an increased rebound value as compared to Control Sample F and Sample G and a Tan delta reduced value as compared to control Sample F.

Interestingly, the reduced hysteresis aspect of Sample H is seen to be provided with a gain in stiffness of Sample H according to its increased Shore A hardness and significantly increased storage modulus G' at 10 percent strain.

However, tear strength (peel adhesion) and DIN abrasion resistance values are seen to be adversely affected in Sample H.

EXAMPLE III

Comparative rubber samples are prepared by blending an ultra high molecular weight polyethylene (UHMWPE) with synthetic cis 1,4-polyisoprene rubber and carbon black reinforcement in the manner of Example I.

The basic recipe for the rubber samples is presented in the following Table 5 which is similar to that of Table 1 of Example I except that silica and coupling agent are included as an ingredient.

TABLE 5

|  | Parts |
| --- | --- |
| First Non-Productive Mix |  |
| Cis 1,4-polyisoprene rubber | 100 |
| Carbon black | 20 |
| Silica[1] | 15 or 5 |
| UHMWPE | 0 or 10 |
| Processing oil | 5 |
| Fatty acid | 2 |
| Antioxidant | 2 |
| Zinc oxide | 3 |
| Coupling agent[2] | 3 or 1 |
| Second Non-Productive Mix |  |
| Mixed to 160° C. and continued mixing for 4 minutes |  |
| Silica[1] | 15 |
| Silane coupler[2] | 2 |
| Productive |  |
| Sulfur | 1.4 |
| Accelerators[3] | 2.3 |

[1]Hi-Sil 210 from PPG Industries
[2]Bis(3-triethoxysilylpropyl) polysulfide having an average of from 3.5 to 4 connecting sulfur atoms in its polysulfidic bridge as a 50/50 composite with carbon black as X50S from Degussa
[3]Mixture of sulfenamide and diphenyl guanidine The following Table 6 illustrates cure behavior and various physical properties obtained for rubber samples based upon the basic recipe of Table 6 and reported herein as Samples I through M, with Sample I being a Control Sample.

TABLE 6

|  | Samples | | | | |
| --- | --- | --- | --- | --- | --- |
|  | Control I | J | K | L | M |
| Silica | 30 | 20 | 20 | 20 | 20 |
| Carbon black | 20 | 20 | 20 | 20 | 20 |
| UHMWPE-1 | 0 | 10 | 0 | 0 | 0 |
| UHMWPE-2 | 0 | 0 | 10 | 0 | 0 |
| UHMWPE-3 | 0 | 0 | 0 | 10 | 0 |
| UHMWPE-4 | 0 | 0 | 0 | 0 | 10 |
| Rheometer, 150° C. |  |  |  |  |  |
| Maximum torque (dNm) | 19.95 | 18.67 | 18.08 | 17.54 | 17.33 |
| Minimum torque (dNm) | 1.91 | 1.77 | 1.74 | 1.77 | 1.73 |
| Delta torque (dNm) | 18.04 | 16.9 | 16.34 | 15.77 | 15.6 |
| $T_{25}$, minutes | 7.9 | 7.2 | 7.2 | 7 | 6.9 |
| $T_{90}$, minutes | 12.9 | 13.7 | 13.5 | 11.5 | 11.2 |
| Stress-strain |  |  |  |  |  |
| Tensile strength (MPa) | 23.2 | 22 | 23.4 | 21 | 22.4 |
| Elongation at break (%) | 490 | 440 | 460 | 430 | 450 |
| 300% modulus (MPa) | 12.9 | 14.5 | 14.4 | 14 | 13.9 |
| Rebound |  |  |  |  |  |
| 23° C. | 53 | 58 | 58 | 60 | 61 |
| 100° C. | 68 | 71 | 72 | 74 | 75 |
| Hardness (Shore A) |  |  |  |  |  |
| 23° C. | 67 | 71 | 70 | 66 | 67 |
| 100° C. | 65 | 68 | 67 | 65 | 65 |
| Tear strength, N (95° C.) | 90 | 38 | 36 | 31 | 33 |
| DIN Abrasion (cc loss) | 132 | 123 | 121 | 107 | 124 |
| RPA, 100° C., 1 Hz |  |  |  |  |  |
| Storage modulus G', at 10% strain (kPa) | 1372 | 1327 | 1291 | 1295 | 1295 |
| Tan delta at 10% strain | 0.13 | 0.093 | 0.092 | 0.087 | 0.084 |

From Table 6 it is seen that improved hysteresis, as evidenced by higher hot and cold rebound values and lower Tan delta (100° C.) values, are obtained by inclusion of silica and coupling agent, together with a partial replacement of silica by the UHMWPE for Samples J through M as compared to Control Sample I.

It is also seen, however, that the tear strength (peel adhesion test) and DIN abrasion values are adversely affected for the Samples J through M as compared to Control Sample I.

EXAMPLE IV

Rubber samples are prepared by blending an ultra high molecular weight polyethylene (UHMWPE) with synthetic cis 1,4-polyisoprene rubber together with carbon black, silica and coupling agent in the manner of Example III except that m-phenylene bismaleimide is included.

The basic recipe for the rubber samples is presented in the following Table 7 which is similar to that of Table 6 of Example III except that m-phenylene bis maleimide is included as an ingredient.

TABLE 7

| | Parts |
|---|---|
| First Non-Productive Mix | |
| Cis 1,4-polyisoprene rubber | 100 |
| Carbon black | 20 |
| Silica | 15 or 5 |
| UHMWPE-4 | 0 or 10 |
| Processing oil | 5 |
| Fatty acid | 2 |
| Antioxidant | 2 |
| Zinc oxide | 3 |
| m-phenylene bismaleimide | 0 or 1 |
| Silane coupling agent | 3 or 1 |
| Second Non-Productive Mix | |
| Mixed to 160° C. and continued mixing for 4 minutes | |
| Silica | 15 |
| Silane coupling agent | 2 |
| Productive | |
| Sulfur | 1.4 |
| Accelerators | 2.3 |

The following Table 8 illustrates cure behavior and various physical properties obtained for rubber samples based upon the basic recipe of Table 7 and reported herein as Samples N through P, with Sample N being a Control Sample.

TABLE 8

| | Samples | | |
|---|---|---|---|
| | Control N | O | P |
| Silica | 30 | 20 | 20 |
| Carbon black | 20 | 20 | 20 |
| UHMWPE-4 | 0 | 10 | 10 |
| m-phenylene bismaleimide | 0 | 0 | 1 |
| Rheometer. 150° C. | | | |
| Maximum torque (dNm) | 20.18 | 17.73 | 18.4 |
| Minimum torque (dNm) | 2.18 | 1.72 | 1.97 |
| Delta torque (dNm) | 18 | 16.01 | 16.43 |
| $T_{25}$, minutes | 8.2 | 6.8 | 8.2 |
| $T_{90}$, minutes | 13.2 | 11.5 | 13.6 |
| Stress-strain | | | |
| Tensile strength (MPa) | 21.2 | 21.5 | 21.1 |
| Elongation at break (%) | 470 | 450 | 460 |
| 300% modulus (MPa) | 12.3 | 13.5 | 12.6 |
| Rebound | | | |
| 23° C. | 53 | 61 | 63 |
| 100° C. | 68 | 74 | 74 |
| Hardness (Shore A) | | | |
| 23° C. | 66 | 66 | 65 |
| 100° C. | 65 | 65 | 64 |
| Tear strength, N (95° C.) | 52 | 29 | 63 |
| DIN abrasion (cc loss) | 126 | 125 | 127 |
| RPA, 100° C., 1 Hz | | | |
| Storage modulus G', at 10% strain (kPa) | 1397 | 1331 | 1379 |
| Tan delta at 10% strain | 0.12 | 0.085 | 0.099 |

From Table 8, it can be seen that addition of the m-phenylene bismaleimide, together with partial replacement of silica with the UHMWPE, in the hot, non-productive mixing stage provided an improved hysteresis as evidenced in Sample P with a significantly increased rebound value as compared to Control Sample N and in a similar manner to Sample O and as evidenced by a tan delta reduced value as compared to Control Sample N in a manner similar to Sample O.

Interestingly, the stiffness of Sample P according to its Shore A hardness is maintained as compared to Control Sample N and Sample O.

Significantly, the tear strength (peel adhesion test) is significantly increased for Sample P as compared to Sample O and somewhat better than Control Sample N.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition, based upon parts by weight per 100 parts by weight rubber (phr) comprises:
    (A) preparing a pre-formed composite by blending in an internal rubber mixer, to a temperature in a range of from about 150° C. to about 180° C. ingredients which comprises:
        (1) 100 phr of at least one conjugated diene-based elastomer;
        (2) about 20 to about 120 phr of reinforcing filler comprised of carbon black and precipitated silica with a carbon black to silica of a weight ratio in a range of from about 1/5 to about 5/1;
        (4) coupling agent for said precipitated silica, where said silica is used, having a moiety reactive with hydroxyl groups on the surface of said silica and another moiety interactive with said diene-based elastomer;
        (5) about 0.1 to about 3 phr of m-phenylene bismaleimide;
        (6) about 2 to about 40 phr of ultra high molecular weight crystalline and linear polyethylene (UHMWPE) having a melting point in a range of from about 125° C. to about 140° C., an average molecular weight in a range of from about 2 to about 20 million g/mol,
    wherein said mixing temperature is at least 10° C. higher than said melting point of said UHMWPE,
    wherein said mixing is conducted by mixing the ingredients at said temperature within said temperature range over a period of from about 2 to about 4 minutes and thereafter continuing to mix the ingredients within 10° C. of said temperature over a period of from about 2 to about 4 minutes, followed by
    (B) Cooling said pre-formed composite to a temperature below 40° C., wherein said cooled pre-formed composite is a temperature in a range of about 90° C. to about 115° C. mixed in an internal rubber mixer with vulcanizing ingredients comprised of sulfur and at least one sulfur vulcanization accelerator to a temperature in a range of from about 90° C. to about 115° C.

2. The process of claim 1 wherein said UHMWPE is in a particulate substantially spherical form.

3. A rubber composition prepared by the process of claim 2.

4. The process of claim 1 wherein said reinforcing filler is carbon black and precipitated silica and said mixing at said temperature in the range of from about 150° C. to about 180° C. is conducted by mixing the ingredients to a temperature within said temperature range over a period of from about 2 to about 4 minutes and thereafter continuing to mix the ingredients within 5° C. of said temperature over a period of from about 2 to about 4 minutes.

5. A rubber composition prepared by the process of claim 4.

6. The process of claim 1 wherein said coupling agent is a bis(3-triethoxysilylpropyl) polysulfide having an average of from 2 to 2.6 or an average of from 3.5 to 4 connecting sulfur atoms in its polysulfidic bridge.

7. A rubber composition prepared by the process of claim 6.

8. A rubber composition prepared by the process of claim 1.

* * * * *